No. 764,573. PATENTED JULY 12, 1904.
O. O. FURRU.
TRANSMISSION GEAR.
APPLICATION FILED MAR. 18, 1904.
NO MODEL. 2 SHEETS—SHEET 1.

Witnesses,
W. H. Palmer
Emily F. Otis

Inventor,
Ole O. Furru.
By Lothrop Johnson
his Attorneys.

No. 764,573. PATENTED JULY 12, 1904.
O. O. FURRU.
TRANSMISSION GEAR.
APPLICATION FILED MAR. 18, 1904.
NO MODEL. 2 SHEETS—SHEET 2.
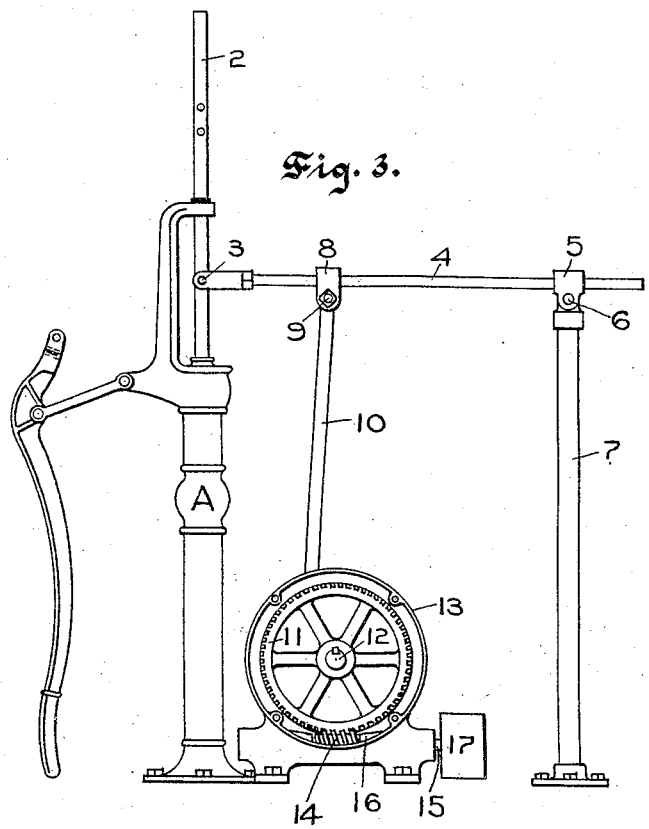
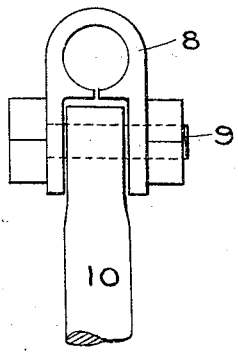
Witnesses,
W. H. Palmer.
Emily F. Otis
Inventor,
Ole O. Furru.
by Lathrop & Johnson
his Attorneys.

No. 764,573. Patented July 12, 1904.

UNITED STATES PATENT OFFICE.

OLE O. FURRU, OF ST. PAUL, MINNESOTA, ASSIGNOR OF ONE-HALF TO ELIAS CRONSTEDT, OF ST. PAUL, MINNESOTA.

TRANSMISSION-GEAR.

SPECIFICATION forming part of Letters Patent No. 764,573, dated July 12, 1904.

Application filed March 18, 1904. Serial No. 198,821. (No model.)

*To all whom it may concern:*

Be it known that I, OLE O. FURRU, a citizen of the United States, residing at St. Paul, in the county of Ramsey and State of Minnesota, have invented certain new and useful Improvements in Transmission-Gears, of which the following is a specification.

My invention relates to improvements in transmission-gears designed for service in actuating a pump-rod from a suitable source of power, such as a gasolene-engine, its object being particularly to provide a simple and easily-adjusted construction and to provide strong and durable operating parts.

To this end my invention consists in the features of construction and combination hereinafter particularly described and claimed.

Figure 1:
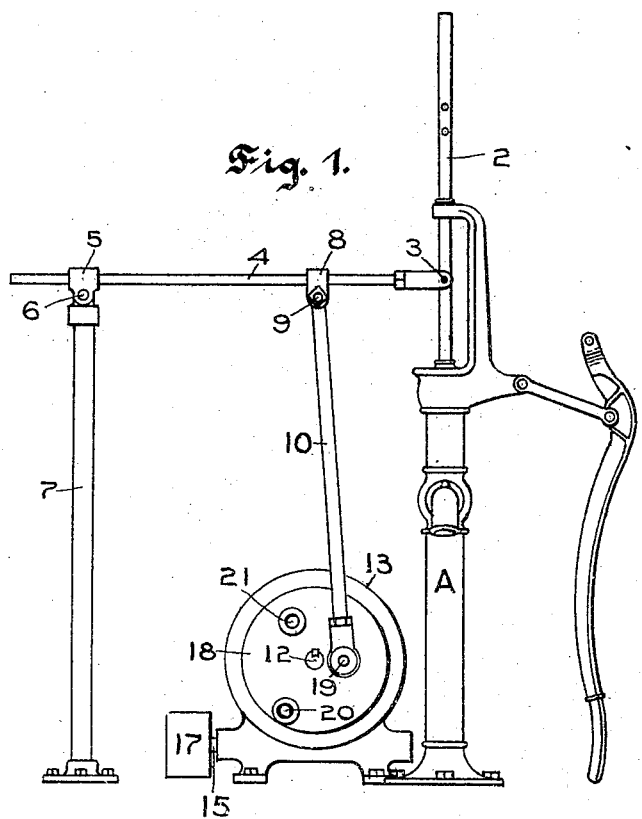
Figure 2:
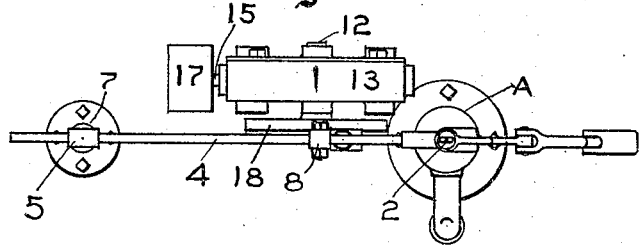

In the accompanying drawings, forming part of this specification, Figure 1 is a front view of my improved device attached to a pump-rod. Fig. 2 is a plan view of the same. Fig. 3 is a rear view with the wall of the casing removed, and Fig. 4 is a view of part of the connecting mechanism.

In the drawings, A represents a pump provided with the usual pump-rod 2. Adjustably connected with the pump-rod by a pin 3 is a horizontal rod 4, which is slidably supported at its outer end in a bearing 5, said bearing having pivotal support 6 upon a post 7. Adapted to be secured in desired position upon the rod 4 is a clamp 8, having pivotal connection 9 with a pitman 10, which connects with a suitable transmission-gearing, as shown. This transmission-gearing consists of a worm-wheel 11, mounted upon a shaft 12 within a casing 13. Below the worm-wheel and intermeshing therewith is a worm 14, mounted upon a shaft 15, extending through sleeves 16 at the lower end of the casing. The shaft 15 preferably is provided upon its outer end with a suitable belt-pulley 17. The face-plate 18 of the worm-wheel is provided with openings 19, 20, and 21, arranged at different distances from the supporting-shaft 12. The lower end of the pitman 10 is adapted to be secured in any one of said openings, thus regulating the stroke. Further regulation is secured by adjustment of the clamp 8 upon the rod 4.

In operation the movement of the pump-rod and the pitman is compensated for by the pivotal connection of the clamp 8 and pitman, together with the pivotal support for the bearing 5 and the slidability of the rod 4 in said bearing. It will be evident that the parts may be easily kept lubricated by keeping the gear-casing partially filled with oil.

Having now described my invention, what I claim as new, and desire to secure by Letters Patent, is—

1. The combination, with a pump-rod and a pivotally-supported bearing, of an approximately horizontal rod pivotally connected at one end with the pump-rod and having sliding support at the other end in the pivotally-supported bearing, a worm-wheel, a pitman connecting the worm-wheel and horizontal rod, and a worm intermeshing with the worm-wheel.

2. In combination, a pump-rod, a pivotally-supported bearing, an approximately horizontal rod connected with the pump-rod and having sliding support at its opposite end in the pivotally-supported bearing, a clamp adjustably supported upon the horizontal rod, a worm-wheel, a pitman pivotally connected with both worm-wheel and clamp, and a worm intermeshing with the worm-wheel.

3. In combination, a pump-rod, a pivotally-supported bearing, an approximately horizontal rod connected with the pump-rod and sliding at its opposite end in the pivotally-supported bearing, a gear-casing, a worm-wheel within the casing, a pitman pivotally connected with both worm-wheel and rod, and a horizontal worm arranged within the casing and intermeshing with the worm-wheel.

4. In combination, a pump-rod, a pivotally-supported bearing, a horizontal rod connected with the pump-rod and having sliding support in the pivotally-supported bearing, a worm-wheel, a pitman, means for connecting the pitman with the worm-wheel at different distances from the center thereof, a clamp supported upon the horizontal rod, pivotal connection between the clamp and pitman, and a worm intermeshing with the worm-wheel.

In testimony whereof I affix my signature in presence of two witnesses.

OLE O. FURRU.

Witnesses:
H. S. JOHNSON,
EMILY F. OTIS.